(No Model.) 6 Sheets—Sheet 1.
J. W. STREET.
STOCK CAR.
No. 336,872. Patented Feb. 23, 1886.
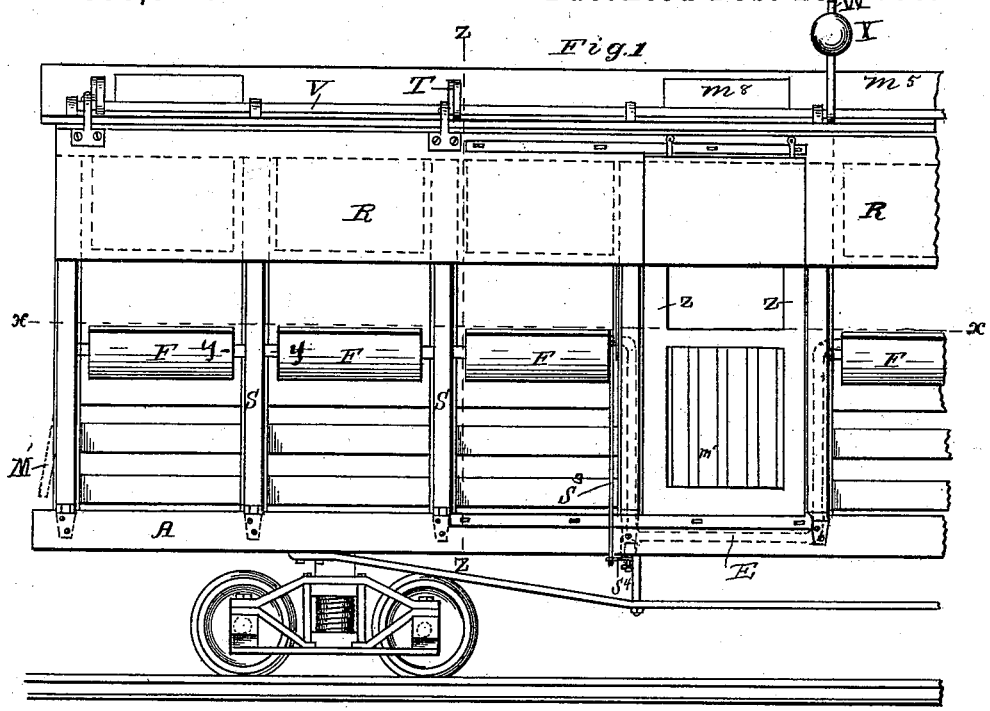
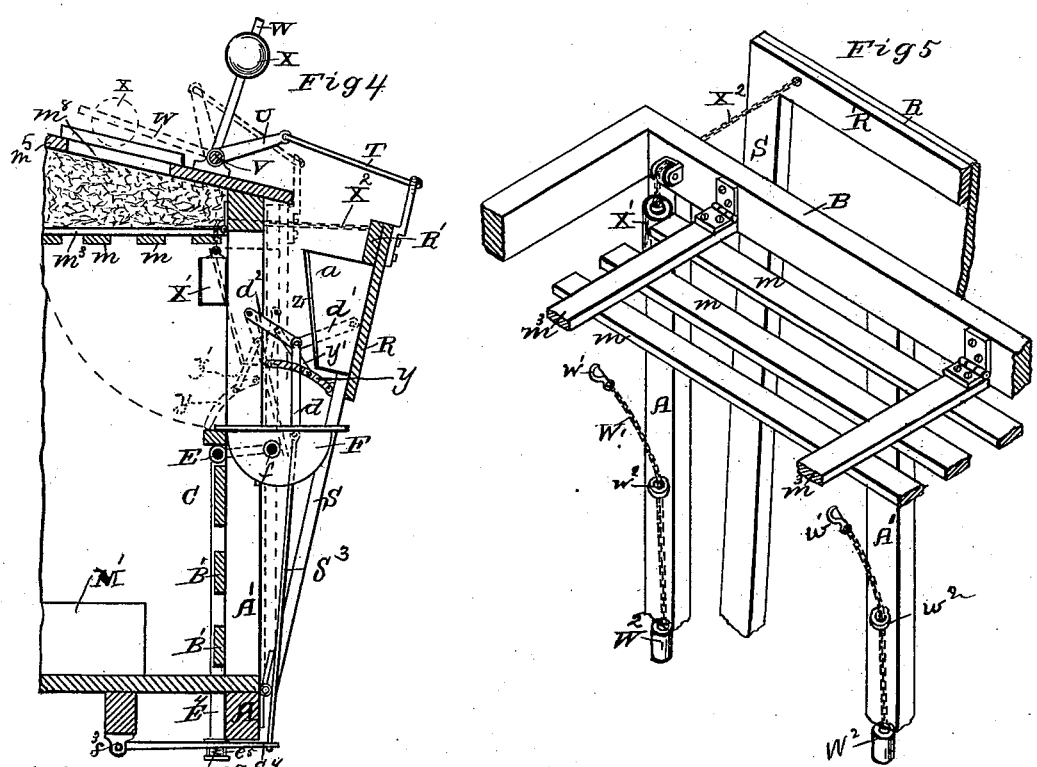
Witnesses:
J. C. Turner
J. S. Barker
Inventor:
John W. Street
by Doubleday & Bliss (No Model.) 6 Sheets—Sheet 2.
J. W. STREET.
STOCK CAR.
No. 336,872. Patented Feb. 23, 1886.
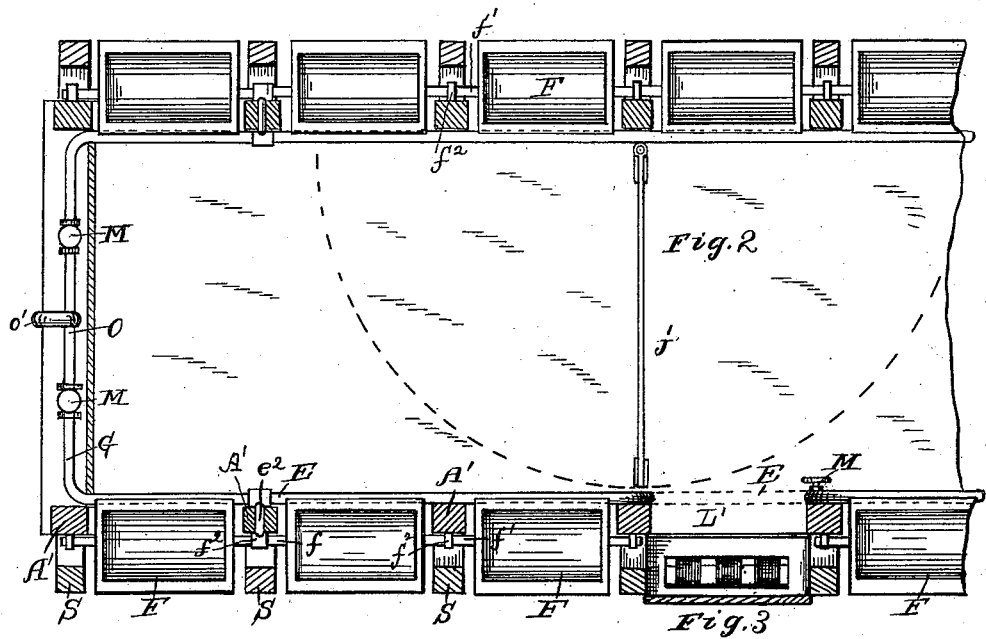
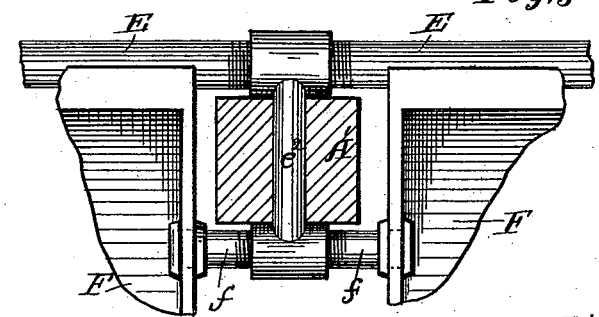
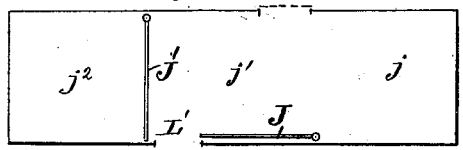
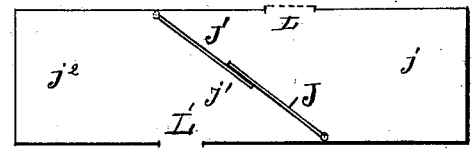
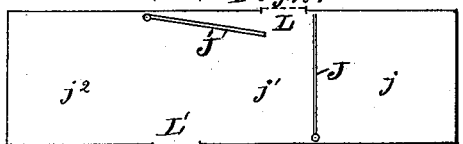
Witnesses:
J. C. Turner
J. S. Barker.
Inventor:
John W Street
By Doubleday & Blin
atty (No Model.) 6 Sheets—Sheet 3.
J. W. STREET.
STOCK CAR.
No. 336,872. Patented Feb. 23, 1886.
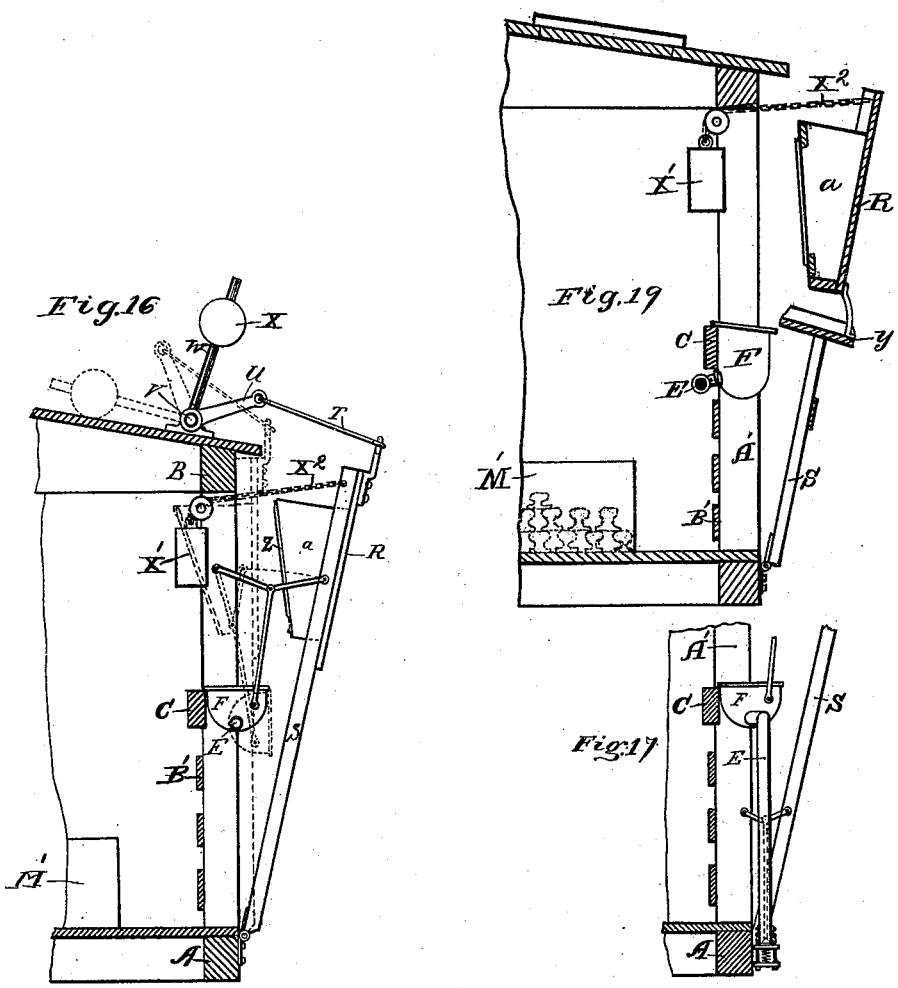
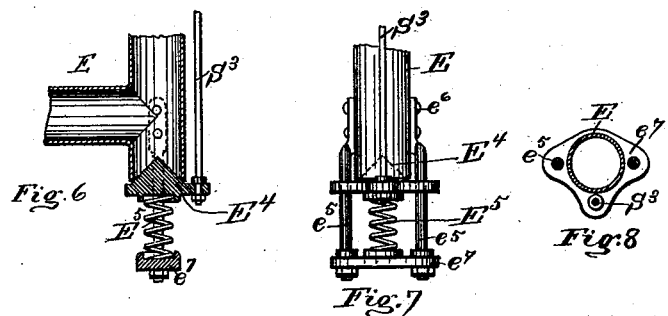
Witnesses:
J. C. Turner
J. S. Barker.
Inventor:
John W. Street
by Doubleday & Bliss
attys.

(No Model.) 6 Sheets—Sheet 4.
J. W. STREET.
STOCK CAR.
No. 336,872. Patented Feb. 23, 1886.
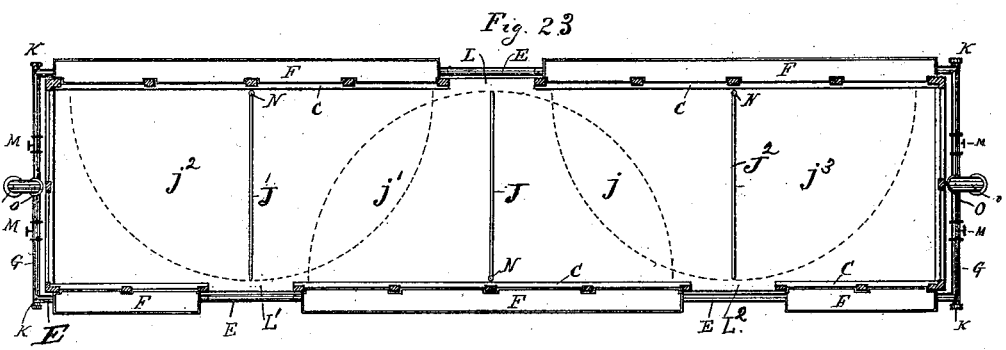
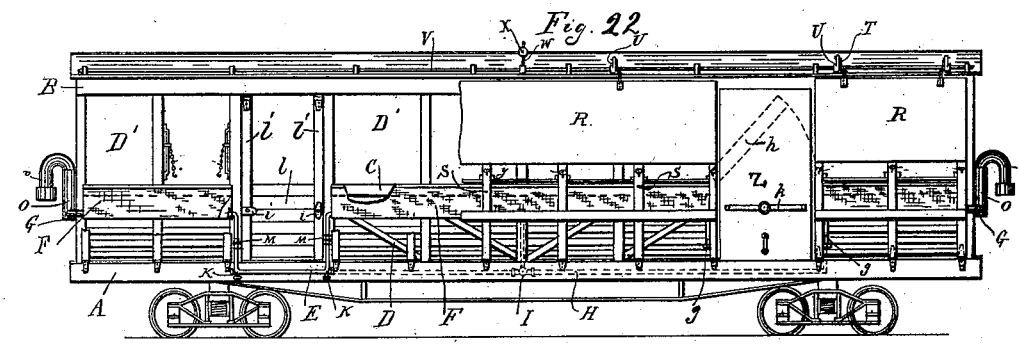
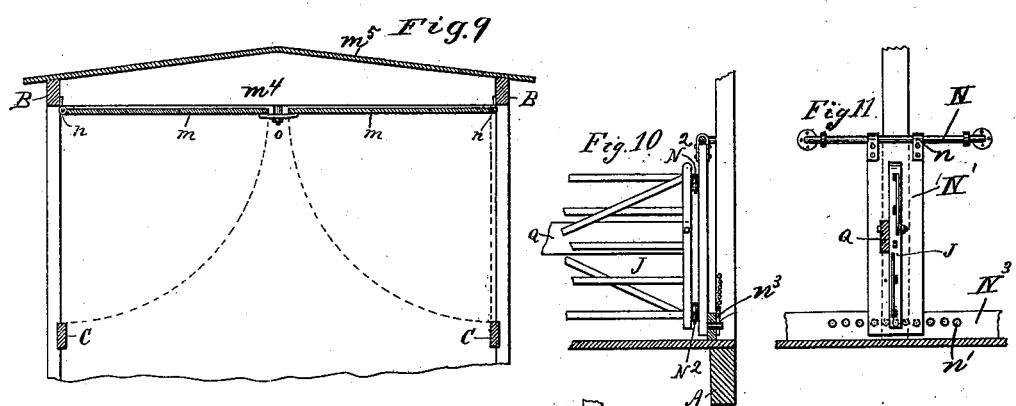
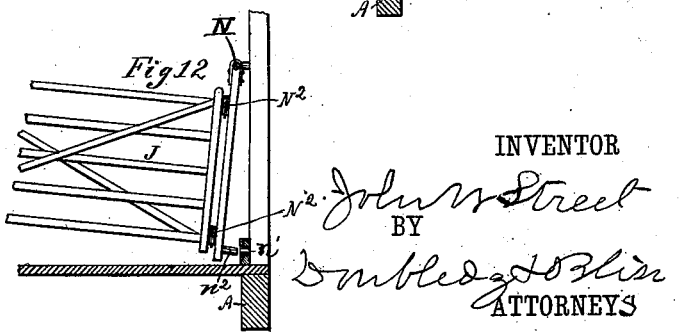
WITNESSES:
J. C. Turner
J. S. Barker
INVENTOR
John W. Street
BY
Dunbledy & Joslin
ATTORNEYS (No Model.) 6 Sheets—Sheet 5.
J. W. STREET.
STOCK CAR.
No. 336,872. Patented Feb. 23, 1886.
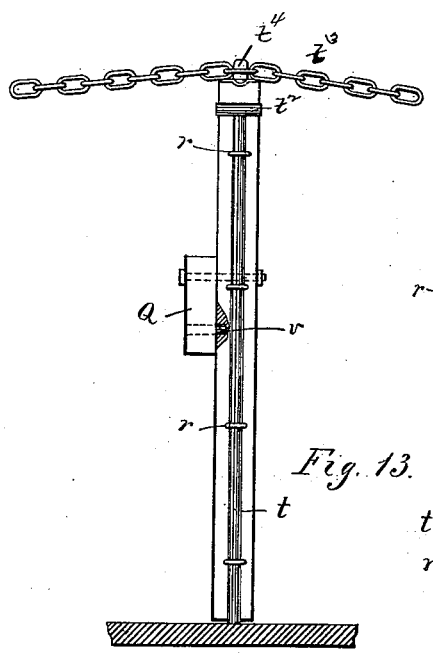
Fig. 13.
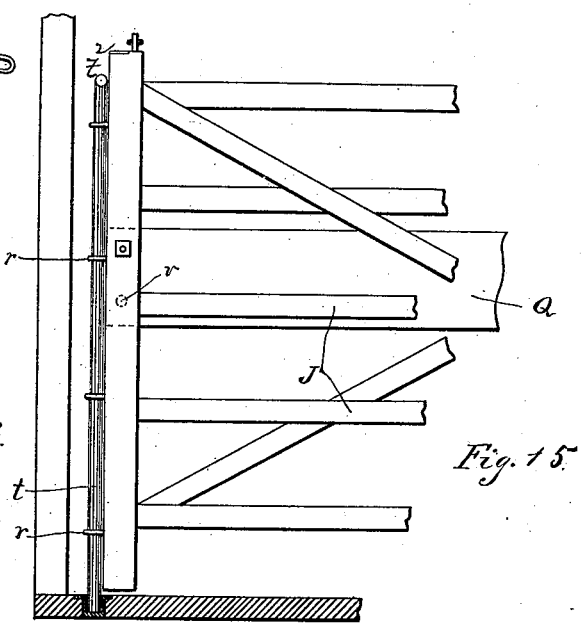
Fig. 15.
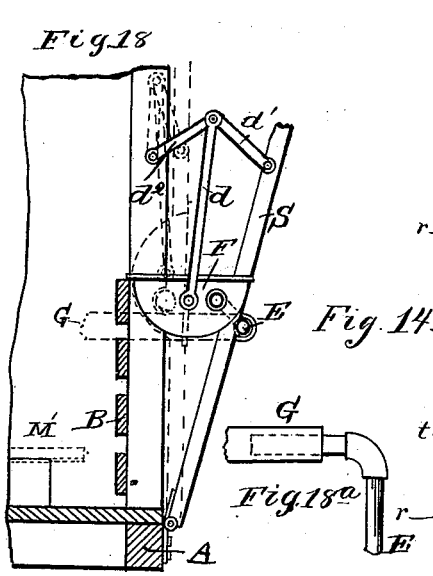
Fig. 18.
Fig. 18a.
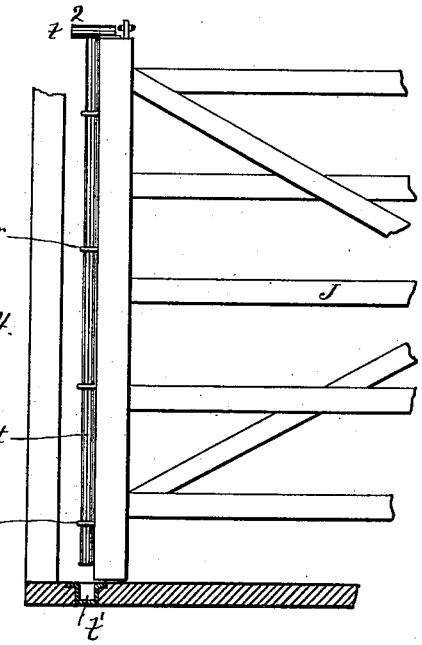
Fig. 14.
WITNESSES:
J. C. Turner
J. S. Barker
INVENTOR
John W. Street
BY
Doubleday & Bliss
ATTORNEYS (No Model.) 6 Sheets—Sheet 6.
J. W. STREET.
STOCK CAR.
No. 336,872. Patented Feb. 23, 1886.
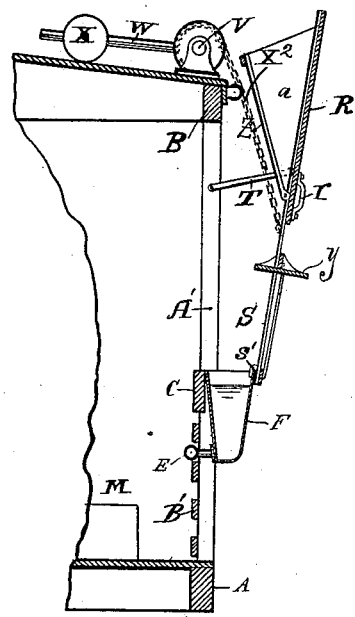
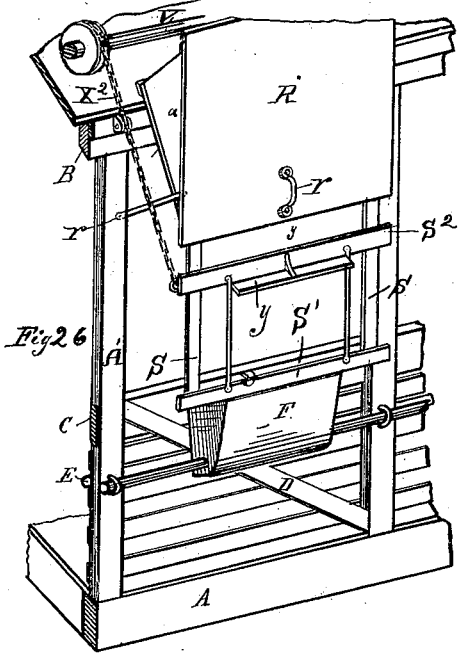
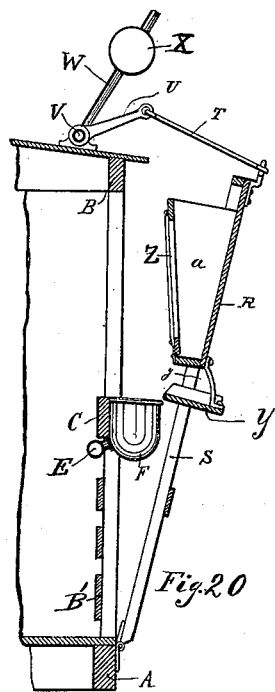
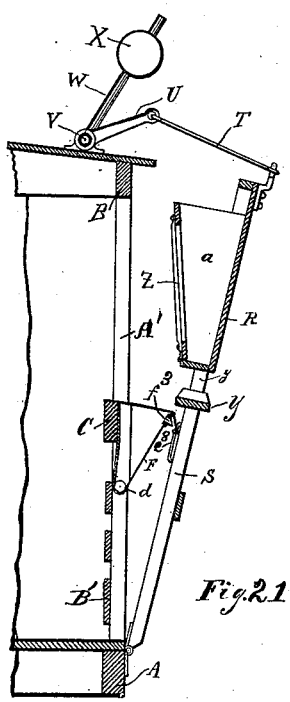
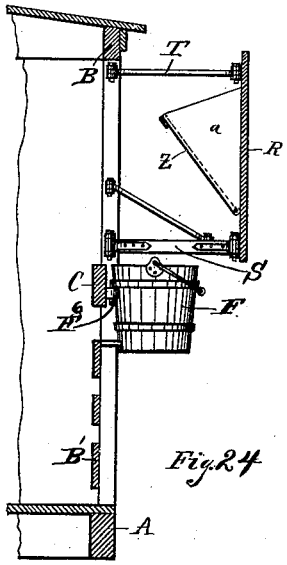
WITNESSES:
J. C. Turner
J. S. Barker.
INVENTOR
John W. Street
BY
Doubleday & Blin
ATTORNEYS

UNITED STATES PATENT OFFICE.

JOHN W. STREET, OF CHICAGO, ILLINOIS, ASSIGNOR OF ONE-HALF TO SIGFRIED M. FISCHER, OF SAME PLACE.

STOCK-CAR.

SPECIFICATION forming part of Letters Patent No. 336,872, dated February 23, 1886.

Application filed May 29, 1885. Serial No. 167,072. (No model.)

*To all whom it may concern:*

Be it known that I, JOHN W. STREET, a citizen of the United States, residing at Chicago, in the county of Cook and State of Illinois, have invented certain new and useful Improvements in Stock-Cars, of which the following is a specification, reference being had therein to the accompanying drawings.

Figure 1 is a side elevation of a portion of a car embodying my improvements. Fig. 2 is a horizontal section on the line $x\ x$, Fig. 1. Fig. 3 is a section through one of the studs and adjacent parts enlarged on the line $y\ y$, Fig. 1. Fig. 4 is a transverse section through one side of the car, taken on lines $z\ z$, Fig 1. Fig. 5 is a perspective of some of the parts. Figs. 6, 7, and 8 show the drainage valves or cocks on a larger scale. Fig. 9 is a transverse section of the upper part of the car, this being intended to show more particularly the positions of the parts which may be used for inside re-enforces for the car-side when the car is employed for other freight than stock, and which also may be used as an inner roof or rack for holding hay. Figs. 10, 11, and 12 are details of the hinged end of an inside partition. Figs. 13, 14, and 15 are detailed views of the opposite end of an inside partition on a larger scale. Fig. 16 is a view of parts similar to those in Fig. 4, except that the inner or lower roof or hay-rack is dispensed with. Fig. 17 shows some of the parts, except that the water-supply pipe is upon the outside of the car-body. Figs. 18, 18ª, 19, 20, and 21 show other modifications of the parts represented in Fig. 16. Fig. 22 is a side elevation, and Fig. 23 a cross-section, of a car corresponding to that shown in Fig. 21. Figs. 24, 25, and 26 illustrate other slightly-modified constructions. Figs. 27, 28, 29, 30, and 31 are intended to illustrate my improved method of driving cattle into and securing them in the cars.

It will be understood that the parts which essentially characterize my invention may be employed with cars of any of the ordinary styles, or of any preferred make, so far as concerns the bed or deck, the trucks, &c. I prefer to construct each with sills A—one at each side—top sills or roof-plates B, and an intermediate sill or brace-plank, C, these running longitudinally of the car, and to be connected transversely by means of girts of any suitable strength and number.

A' A' represent the studs, which are at the lower ends secured to the sills A and at their upper ends to the roof-plate B. The brace-plank C is preferably situated on a line just below the heads of the animals, and between this plank and the bottom sill A slats or boards B' are secured to the studs A', these preferably having openings or narrow passage-ways between them for free ventilation, &c. The spaces D' between the studs A' and above the brace-plank C are left open, so that the animals within the car can readily thrust their heads outward between the studs. If the roof-plate B is sufficiently far above the plank C, permanent slats or boards may be also secured to the studs near the said plate B, so long as apertures or openings are provided which are large enough for the purposes above set forth.

Heretofore when cars of this character have been formed with apertures for the passage of the heads of the animals, they have had attached to them doors which could swing or slide toward and from the apertures, respectively; but much difficulty has been experienced from the fact that as heretofore constructed the doors or covers for the openings were not so constructed and arranged that the animals should at all times have directly in front of their heads a guard which would prevent them from attempting to force their way out through the opening or aperture allowed for their heads. One of the ends at which I aim is to allow the animals to pass their heads out through the side of the car when required, and at the same time have before them a guard, which will prevent them from attempting to break through the aperture or opening allowed for the heads, this guard being provided by the door, gate, or movable side piece, which I utilize for closing the aperture or opening for the head.

Referring to Figs. 1, 2, 4, 5, and others, it will be seen that the aperture can be closed by means of a part indicated at R. This, as shown, is made tight from top to bottom, as certain advantages are thereby secured; but instead thereof, slats with openings between them may be used, if desired. This horizontal part (consisting of one or more boards or bars) is secured to vertical bars or uprights S, which extend down to and are hinged to the sill A.

The door or closing device proper, R, is so situated that when it is moved inward it shall close one or more of the openings between the studs and above the brace-plank C. Its outward movement is limited, so that it cannot move away from in front of the aperture or opening aforesaid, this limit being effected by means of a stop or holding device, which allows it to go out far enough to permit the animals to thrust their heads out, but which will accomplish the end above set forth—namely, prevent its moving so far away as to leave the space in front of the said openings or apertures entirely uncovered.

In the construction shown in these figures the holding devices or stop consists of one or more links, T, pivotally connected with the door or closing-piece, and also pivotally connected with a rock-shaft or rotating shaft, V, at the upper part of the car. These devices may be utilized not only as a stop or retainer, but also for moving the door in and out. To accomplish this function, I attach to the shaft V a lever, W, by which it can be turned sufficiently to effect the desired movement of the door. The shaft V and its adjacent parts may be located below the outer roof, if desired. These doors, shutters, or closing devices R are preferably so connected together on each side of the car that they shall all swing together, the parts that carry them being united, so as to form one continuous frame-work. This is not essential, however, as the closing devices may be broken up on each side into as many sections as are desired. If a bar, R′, such as shown in Figs. 4 and 5, be employed, extending from one end to the other of the car, the swinging frame can be utilized to support the doors Z, which are used to close the entrances to the car, as these doors may be arranged to slide to and fro upon guides or supports in the ordinary manner.

It will be readily seen that this part of my invention (relating to the doors or shutters R) may be considerably modified without departing from the spirit thereof—that is to say, so long as there is a retaining of the feature above set forth—namely, a door or closing device, which permits the passage of the animal's heads, but which is held in front of the apertures or openings to prevent the animals from attempting to escape, there being sufficient space outside of the car-wall proper for the animals to drink from a receptacle on the outside.

I have shown some of the many modifications, and others will suggest themselves to those conversant with such structures.

Referring to Figs. 25 and 26, it will be seen that the bars S are not pivoted at their lower ends to the car, said ends being adapted to be elevated, so that they can be supported upon any suitable holder. As shown in these figures, they can rest upon the outer edge of the water-trough, they being connected together by means of a longitudinal bar, S′, at the bottom, and a second bar, S², at some distance above. Preferably, the bars S S are at such distance apart that they shall not strike or be interfered with by the part below which supports them. The bar S′ has hooks or clasps $s'$, which engage with the support. Near the upper part of the door or closing device R there are links T, which provide a flexible connection with the car. If necessary, a handle may be provided, as at $r$.

The method of operating the devices shown in these Figs. 25 and 26 will be readily understood. It is merely necessary to grasp the handle $r$ and lift up the door or closing device, the latter swinging outward as well as upward until the bar S′ is brought so that it can be rested upon and secured to the support at the bottom.

In Fig. 24 the door or closing device R is mounted in such way that it can be swung on horizontal lines. When it is thrown out, it stands in front of one of the openings for an animal's head, and when it is thrown in it closes tightly one of the adjacent openings. The bars S and links T in this case are also united by a hinge-connection or flexibly to the car; but the axes of the hinges are vertical and not horizontal, as in Fig. 4, and the end of each bar S which is attached to the car is situated at or near the bottom part of the opening for the animal's head. If either of the end apertures or openings of the car is left exposed, a supplemental door or closing device may be provided and connected with the others of the series, so that when they are moved in either direction, it also shall be brought into such position as to act as a guard.

It will be seen that in this case, as in others above described, there is always in front of the openings or apertures between the studs A′ a guard, which acts to prevent the animal from attempting to break through or escape, and at the same time this guard is so arranged that it can be used to form a part of the side wall of the car when all of the parts are closed up.

With the door or shutter may be combined a counterbalancing-weight.

Referring again to Figs. 4, 5, and others, a weight will be found represented at X′, connected with the door or shutter by a chain, X², running over a pulley attached to the car. The weight X′ may be arranged in any suitable way, so that it will not interfere with the other parts. When employed, it can be situated near the end stud, as shown in Fig. 5. When a weight of this character is combined with a rock-shaft for operating the door or shutter, said shaft may be provided with a supplemental weight, as at X, which will assist in holding the parts either in their outer positions or in their inner. The weight X′ may be alone depended on for the counterbalancing, as shown in Fig. 19. Again, the chain $X^2$ may be connected with a shaft of the character of that at V, as shown in Figs. 25 and 26; or the weight $X'$ and chain $X^2$ may be dispensed with and the weight X, connected directly with the counter-shaft, may be depended on to effect the counterbalancing, as shown in Figs. 20 and 21. However, the other features pertinent to the door or shutter R are not dependent essentially upon the use of a counterbalancing-weight.

In order to hold hay or other similar food in the car within reach of the animals, I employ a supplemental or lower roof—that is, one below the main roof $m^5$—there being between the two roofs a chamber or space wherein the said food can be stored. This inner or supplemental roof may be formed of slats or boards, as shown at $m$, Figs. 5 and 4, carried by bars $m^3$ hinged to the sides of the car, the slats or boards having spaces between them, through which the hay can be drawn by the animals. A hay-holder of this sort is an important feature in a car of the character of mine, by reason of the fact that the animals are to a greater or less extent allowed to choose their own position, the interior space being entirely unobstructed and the devices for watering and feeding being entirely outside of this space, as will be more fully described. That which enables the animals to have more or less option in the positions they occupy is the horizontally-swinging partition or partitions by which the car is divided up into two or more compartments, the partition or partitions preventing one set of animals from crowding upon or interfering with those of the other set or sets. By employing in combination therewith a hay-holder of the character described they are permitted to have access to food in whatsoever position they may be.

I am aware of the fact that heretofore a stock-car has been provided with a double roof, the inner or lower roof being provided with narrow openings through which the cattle may draw the hay, such construction being shown in patent to A. Welch, No. 127,443, June 4, 1872; and I do not broadly claim this feature of construction by itself considered. The hay can be introduced to the space between the two roofs by means of trap-doors $m^6$.

I prefer under most circumstances to employ supplement hay-racks, as shown at $a$, these being situated along both sides of the car. They are lower than the hay-holder above described, and may be filled from the latter, if necessary, these side racks being adapted to permit the animals to feed with somewhat more ease; but if at any time they should become empty food can still be obtained from the holder above. The side racks, $a$, may be of any suitable construction in detail. They are shown as having open tops for filling and slatted inner sides, as at $z$. They are attached to the above-described movable doors or shutters, and when the latter are moved out the racks are carried with them, thereby leaving the upper part of the car free for the outward passage of the animal's head.

F F represent the water-troughs. Referring again to Figs. 1, 2, 3, 4, and others, it will be seen that these troughs are situated entirely outside of the slats or boards $B'$ and the brace-plank C, which virtually form the side of the car proper—that is to say, which bound the interior space allotted to the animals.

Heretofore troughs have been arranged upon the inside of the vertical plane of the parts $B'$ and C, and so constructed that they can be tipped inward—that is, into the space occupied by the animals when they are supplied with water. This arrangement has been found very objectionable, not only because it takes up much of the space between the side walls, all of which space is required for the animals, but also because when the refuse water, litter, &c., is emptied from the trough it tends to drop directly downward upon the floor or deck of the car. In other constructions the troughs have been arranged on the outside of the car-wall with openings for the animals to pass their heads out; but in the cars having these two features—to wit, the openings for the outward passage of the entire head of the animal and outside water-troughs—the latter have been so arranged that it was impossible to keep them cleansed from refuse and objectionable material (seed, grain, hay, offal, &c.,) without much trouble and labor, as the troughs were never so arranged that they could be instantly tilted or inverted; thirdly, tilting troughs have been used so hinged that the inner portion could be tipped into the space inside of the car-wall, the animals not being allowed to thrust their heads entirely out; so, too, fourthly, they have been constructed with apertures through which the heads could be passed, in combination with an outside trough having its inner edge hinged to the outer sides of the studs, the trough tipping toward the car—that is, having its outer edge raised when it is emptied, and lying entirely outside of the studs when out of use.

The objections incident to each of the constructions heretofore in use I have succeeded in obviating by combining with a car, having openings through which the animals can pass their heads, a trough or troughs so hinged that the outer edge can be depressed when they are to be emptied, the trough or troughs lying entirely outside of the car and being adapted to have the outer edge lowered, whereby the water and other refuse can be thrown outwardly away from the car, and whereby the trough when out of use shall have the greater part of its body situated inside of the outer surfaces of the studs.

The troughs are constructed in sections, each lying between two adjacent studs. They are preferably hinged by means of the pipes which supply the water to them. The main water-pipe is represented by G E, the former indicating that part of the pipe which passes across the ends of the car, and the latter that part which is situated along the side. The side part has drooping portions which pass around and below the entrances to the car, as will be seen in dotted lines in Fig. 1 and in full lines in Fig. 22, the supply-pipe being on the inside of the car in Figs. 1, 2, and others, and on the outside in Figs. 22, 23, and others. At points of any suitable number the water is taken from the main supply-pipe E to the troughs through branch pipes $e^2$. (See Figs. 2 and 3.) The branch pipes $e^2$ communicate with adjacent troughs by means of short pipes $f$, which are loosely connected by water-tight joints to the troughs F. Preferably the branch pipes $e^2$ pass through the studs A', though this is not essential; but one of these branch pipes is necessary for those troughs which lie in a continuous series, those troughs not communicating directly with the branch pipes having communication with each other by means of interposed pipes $f'$, which convey the water from one to another along the series.

The connecting-pipes $f'$ can be made to serve as journals for the troughs for securing them in suitable bearings, for which staples (shown at $f^2$) will suffice. To attain the best result the cross-pipes G and the side pipes, E, should be situated on substantially the same level. O is a coupling and $o'$ a section of hose adapted to connect the cross-pipe G with a water-supply. It will be seen that when the water is let on to the pipe G it is immediately delivered to both sides of the car, and is at once carried from one end to the other along each side. The water passes along the pipe E and reaches the short branch pipes $e^2$, through which it flows into the adjacent troughs through pipes $f$. From the troughs first receiving it, it passes to the others through the hollow connections $f'$. In this respect the supply devices are much superior to those in which the water is allowed to descend through and fall from spouts or open-ended pipes, as I prevent all splashing and dashing out, and by having the pipes E and the connection pipes or pipe G around the car, all of the troughs can instantly be filled from a single supply-orifice.

Inasmuch as at sometimes the car is stopped upon a grade or upon a curve where one side of the track is higher than the other, I combine with the supply devices stop-cocks or valves so situated that I can cut off the water either from one side or the other, or from one end or the other, so that there shall be no overflow of water at the lower parts. These are represented at M, there being preferably two combined with each cross-pipe, and one or two with each of those parts of the side pipes which droop down around the entrances. (See Figs. 2 and 22.)

With respect to the moving of the troughs it may be said that they can be rocked or tilted by any of the well-known devices—such as cranks to be operated by hand, or shafts and chains; but in order to have all of the movable parts operated by one act of the attendant I prefer to connect the troughs with the above-described doors or closing devices R, and in such way that the troughs have imparted to them a positive thrust or push to depress their outer edges and a positive lift or pull to draw them into the position for drinking.

$d$ represents a link, connected to the trough and also to two toggle-arms, $d'$ $d^2$, respectively pivoted to the door or shutter and to the car. When the door is thrown out, link $d$ is drawn up, and vice versa.

Still referring to Figs. 2, 3, and 4, it will be seen that the trough is mounted away from the center of gravity inside thereof, so that the weight of the contents will assist in turning it down when it is to be emptied. The journals of the trough are at some distance from the bottom, so that when depressed the body thereof will be situated between the studs. When they are constructed and arranged in this way, that part which lies outside of the axis may be as long as is necessary, provided, that the depth be not so great as to interfere with closing the troughs into the space between the studs, as aforesaid. However, the other features incident to my invention with respect to tilting the trough are not limited to this, as many of them may be preserved, although the trough be otherwise hinged, as shown in Fig. 16. In fact, some of the advantages may be attained, even if the trough be hinged to the swinging door or closing device, as shown in Fig. 18, wherein the outer edge is depressed while the door is closing, the toggle-levers in this case being inverted and the supply-pipe E being connected with the cross-pipe G by a telescopic joint or equivalent, as in Fig 18$^a$.

As there is more or less water left in the supply-pipes after the troughs have been turned so as to empty them, I combine with said pipes means for automatically opening them at one or more points at each side of the car, so that all of the surplus water which they contain can be allowed to instantly escape. By these devices I not only prevent the freezing of water, but also assist in keeping them cleansed of any objectionable matter which may tend to accumulate therein. I have shown in Figs. 4, 6, 7, and 8 the devices which I prefer for this purpose, although they may be more or less modified without departing from this part of the invention. At one of the lowermost points of the supply-pipe—as, for instance, at the bottom of the dropping part beneath the entrance—I provide a valve, $E^4$, adapted to tightly close an orifice formed in the conduit. This valve is held in place by means of a spring, $E^5$, both of these parts being supported and guided by a stirrup or frame having legs $e^5$, riveted to the supply-pipe, as at $e^6$, and carrying one or more plates, as at $e^7$. The spring $E^5$ holds the valve against its seat tightly enough to prevent the escape of water. With the valve there is connected an opening-rod, $S^3$, which may be united with the other movable parts in any way suitable for effecting an automatic movement of the valve. As shown in Fig. 4, it is connected with the trough. These parts are so related that when the door or closing device R is moved in the opening-rod $S^3$ is thrust down, whereby the valve $E^4$ is moved from its seat and any water that may be left in the pipes is instantly withdrawn. In Fig. 4 the rod $S^3$ is connected loosely with a rod, $S^4$, pivoted to the under side of the car; but when the supply-pipe E is on the outside of the car, as in Figs. 17, 22, and 23, this rod $S^3$ may be connected directly with the drainage valve or cock $E^4$, as shown in Figs. 6, 7, and 8.

While I have above alluded to the trough as pivoted, yet some of the novel features may be retained if troughs of other forms be employed.

I have shown several modified forms in Figs. 19, 20, 21, 22, 23, 24, 25, and 26. In Figs. 19 and 20 a stationary trough is shown, the constructions in these figures being alike, except as to the stop or retaining device which holds the door in front of the aperture, and as to the counterbalancing-weight. In this case the trough is supplied from pipe E by short branches, and a cover, $y$, is secured to the swinging parts and adapted to be placed on top of the trough when the door or shutter is brought to its place. Fig. 25 shows a trough substantially similar, the cover in this case being brought into position by the bars S. In Fig. 26 the parts are substantially similar to those in Fig. 25, although the trough in this case may be made to swing, if desired. In Figs. 21, 22, and 23 a trough is shown formed of flexible material—such as canvas, rubber, or their equivalent. To insure the opening of the trough, I employ a link, $f^3$, engaging with a stirrup or guide, $e^8$. When the door or closing device is moved in, the trough readily collapses, so as not to interfere with the other parts. In Fig. 24 the water-receptacle F is shown as being made in the form of any ordinary bucket or pail, detachably hooked into position at $F^6$. These receptacles can either be filled separately or have a supply-pipe adapted to supply several simultaneously.

Another important advantage possessed by my structure lies in the combination of the transverse partitions or gates on the inside of the car hinged so as to swing horizontally, and the troughs or watering devices placed entirely outside of the walls proper—that is to say, outside of the full normal width of the car. By so arranging these parts relatively to each other, I can have the partitions arranged to swing freely, and can make them as long as desired without any possibility of their striking or interfering with the troughs.

I am aware of the fact that use has been made of horizontally-swinging partitions together with troughs situated inside of the side walls of the car, they being shown in a former patent granted to me, and am also aware that troughs have been situated on the outside of the car; but I do not know of any structure of this sort heretofore in use having all the advantages of my present one in this respect.

By examining the drawings it will be seen that I can swing the partitions over large areas of the car, the walls and interior chamber being entirely free from troughs and other obstructions. With the partitions thus arranged I can very quickly force the animals into those positions required to permit them to have access readily to the watering-troughs on the outside of the car. In Figs. 1, 2, 27, 28, 29, 30, and 31 provision is made for two of these partitions on the inside of the car. In Figs. 22 and 23 three of these partitions are used. In the former figures, J J' represent the partitions, and L L' the entrances to the car, there being dotted lines in front of the entrance L', Fig. 27, which indicate the chute $L^3$, through which the animals are taken up to the car.

In loading the car it is brought so that one of the entrances coincides with the chute $L^3$. When the door L' thus coincides, it is desirable to load first the compartment $j$, the partitions at first being as shown in Fig. 27. After the proper number have been driven in, the partition J is swung around and the other partition, J', is caused to quickly follow it, as shown in Fig. 28, and the animals are thereby forced into the compartment $j$, the partitions swinging forward until that at J reaches the position shown in Fig. 29, where it is quickly fastened by hooks or otherwise at the end opposite to the hinge. Then the partition J' is fastened in the position shown in Fig. 30, until another lot of animals have been driven into the compartment $j^2$, after which said partition is quickly moved into the position shown in Fig. 31, where it is firmly fastened. Then the compartment $j'$ can be easily filled, and the door which closes the entrance can be put in place. It will be understood that during these operations the door at L is closed, as shown by dotted lines in Figs. 27 to 31. By having the car thus constructed, and by following this method, the wildest and most vicious animals can be rapidly imprisoned, and it can be done with perfect safety for the men engaged, as the horizontally-swinging partitions act as barriers which can be interposed at all times between the men and the animals in the car, and the great danger heretofore experienced is overcome. Substantially the same end can be attained when three or more partitions are employed, as in Fig. 23, the movements and overlapping positions of the partitions being shown by dotted lines. By having the troughs on the outside it is not necessary to arrange the animals so as to face in a given direction.

The partitions and the means for mounting and holding them I prefer to have substantially as shown in Figs. 10, 11, and 12—that is to say, each partition is suspended from a guide, N, which is properly secured to the wall of the car. Between the partition and the guide N there is interposed a supporting plate or board, N', which is hinged to both of the aforesaid parts—that is, hinged to the partition at N² and hinged to the guide N—by means of eyes $n$, engaging with the latter. The connection with the guide allows the partition to swing vertically, and the connection with the supporting part N' allows it to swing horizontally. Below the guide N and on or near the floor of the car I arrange a perforated plank or plate, N³, provided with apertures $n'$. The supporting part N' carries a pin, $n^2$, adapted to engage with one or another of these apertures $n'$. When the partition is provided with these means for holding it, it can be adjusted to any necessary position longitudinally of the car and instantly fastened rigidly in place. If necessary, a pin—such as shown at $n^3$—may be combined with a pin, $n^2$, the latter being perforated to receive it.

By referring to Figs. 13, 14, and 15 it will be seen that the partition at the opposite end is secured to the car by a simple but firm fastening. It consists of a sliding bolt or bar, $t$, held by staples or eyes $r$ against the end of the partition. The lower end is adapted to engage with one or another of sockets $t'$, fastened to or in the floor of the car, and the upper end being T-shaped, as shown at $t^2$, can, when the bolt is out of engagement with the floor, rest upon the top of the partition-post so that the gate can be freely swung in either direction. If the gate is directly opposite the center of a door—that is to say, so that its outer end lies in or nearly in the center of the doorway—it may be firmly fastened by means of a chain, $t^3$, the ends of which are fastened to the post by the side of a door, and with the links of which a pin or stud, $t^4$, carried by the partition, is adapted to engage. At M' M' there are doors or slatted blinds, these being situated at or near the bottom of the car at the ends, and adapted to have long stuff—such as pieces of lumber, railroad-iron, &c.—passed through them. Such material is often used to load the cars on return-trips, and by having the hinged partitions J J' J² arranged as mine are, and the interior space of the car entirely free, I can utilize doors of this character to great advantage.

The parts $m$ $m$, above alluded to as being adapted to form an inner roof or hay-holder, are also adapted to serve as re-enforces along the upper parts of the sides of the car when the latter is to be used for freight other than livestock. These cars are often loaded with coke or other loose material on their return-trips, and by providing re-enforcing devices of this character I am enabled to relieve the side pieces of the car entirely of undue strain or pressure, and can prevent the weight of the load from bearing against the swinging doors or shutters R. When said parts $m$ $m$ are formed with openings, (to be utilized when live stock is in the car,) they can if used for other freight be made tight, as shown in Fig. 9, in which figure also is shown a simple device for holding them in their elevated position, it consisting of a turn-button at $m^4$.

Another element which I bring into play when the car is loaded with freight other than live stock is a re-enforce for the entrance to the car or a closing device. It is shown in Fig. 22 as consisting of bars $l'$ $l'$, hinged at the top of the car and long enough to reach the bottom of the entrance. At the lower ends these bars $l'$ have bars or boards $l$ secured thereto, forming a wall. When live stock is upon the car, these parts $l$ $l'$ are held up against the roof; but when other freight is to be loaded upon the car one of these is let down into the position shown in Fig. 22, the re-enforces $m$ $m$ having been lowered into position on the inside of the car, and all of the entrances but one having been closed. Thus there is provided an aperture above the horizontal boards $l$ through which the freight can be introduced, the remainder of the car being tightly closed.

By means of bars $h$ (shown in dotted lines, Fig. 22) the doors at the entrances can be readily fastened firmly. This Fig. 22 also shows other means for carrying the water from point to point around the car, which can be used in place of those above described. At H is a pipe in dotted lines, adapted to carry water longitudinally of the car. At $k$ a short pipe-section is shown secured to the outer face of the door, which can be connected to the adjacent troughs—this to be used, if desired, in place of the drooping pipe above alluded to.

In the construction shown in Fig. 4, also, use is made of the cover $y$, analogous to those in the other construction above described; but in this case it is pivotally connected with the swinging door or closing device R, and is also supported by a link, $y'$, which insures that it shall have the position indicated by full lines when the trough is up in the operative position, and that it shall take the position shown in dotted lines when the trough is down. A cover of this character is of great advantage, as it operates to prevent the filling of the troughs or the clogging of the journals with offal and other objectionable material. In winter these materials become serious impediments, as by freezing they more or less prevent the requisite movements of the trough, and at all times the presence of filth in the troughs is of great disadvantage.

In Fig. 22 I have shown at $p$ $p$ the devices heretofore in use for fastening horses' heads, they consisting of long staples secured to the car and chains connected to the staples loosely by rings. Under some circumstances it is desirable to have the chains kept taut to a limited extent, although they should at the same time be sufficiently free to permit the horses to lift their heads when necessary. I employ eyes or holders $w^2$, through which the chains W' pass loosely, the latter having weights $W^2$ at their lower ends and snap-hooks $w'$ at the upper. The weights should not be so great as to exert any strain upon the animals, and yet heavy enough to keep the chains taut.

What I claim is—

1. A stock-car having the upper portions of its side walls attached to hinged bars or uprights which are movably connected to the car-body, substantially as set forth, whereby the upper portion of said body can be expanded or widened, as described.

2. In a stock-car, the combination, with the lower stationary side wall fixed permanently in position, with an opening or openings above said stationary wall for the outward passage of animals' heads, of an upper swinging wall held by movable bars supported upon the car at points below the swinging wall, substantially as described.

3. In a stock-car, the combination, with the side wall having an aperture or apertures for the passage of animals' heads, of a door supported and adapted, substantially as set forth, to have both its lower edge and its upper edge move away from the car-side, substantially as described.

4. In a stock-car provided with an aperture or doorway for the outward passage of the animals' heads, the combination of a trough situated entirely outside of the side wall of the car, and a door to close the said aperture or doorway adapted to be moved toward and from the said aperture, and retaining devices, arranged substantially as set forth, to prevent the door from moving entirely away from in front of the aperture, whereby a door or guard is presented to the animals when their heads are passed outward through the said aperture, substantially as set forth.

5. In a stock-car, an aperture or doorway formed in the side wall of the car adapted to permit the outward passage of animals' heads, and a door united to the car, substantially as set forth, whereby it is adapted to move into said aperture to form a part of the side wall and also to move away therefrom, there being, when it is moved away, a free space between the lower edge of the door and the wall of the car, to permit the movements of the animals' heads, and a stop which prevents the door from moving away from in front of the aperture, substantially as set forth.

6. In a stock-car, a doorway or aperture in the side of the car to permit the passage of the animals' heads, a door or gate united by a hinge with the car and adapted to swing away from said doorway or aperture to a distance which is limited, to prevent it from moving away from the horizontal lines of the said door or aperture, and a food-rack secured to the inner side of the door or gate, substantially as set forth.

7. In a stock-car, a side wall formed of uprights A' and slats or rails B', arranged to provide openings for the outward passage of the animals' heads, in combination with vertical bars S, united by hinge-connection with the car, and horizontal bars or boards R, secured to the said vertical bars on lines corresponding to the aforesaid aperture or opening in the side wall, whereby the said vertical bars S and the horizontal bars or boards R, secured thereto, are adapted to swing in to close said aperture and to swing out therefrom, and a holder which prevents the said horizontal bars or boards from moving away from in front of the upper open part of the side wall, substantially as set forth.

8. A stock-car having a side wall formed with a lower slatted or closed portion, vertical studs, and an upper unslatted portion, whereby openings or doorways are left between the studs, and doors or closing devices for the said aperture or doorways, united to the car by hinge-connection at or below the lower parts of the said apertures or doorways and united also by hinge-connection to the car at or above the upper parts of the said apertures or doorways, substantially as set forth.

9. A stock-car having an aperture or opening in the side wall for the passage of an animal's head, in combination with a door or closing device having its lower part united by a hinge-connection to the car, and its upper part also united by a hinge-connection with the car, said hinge-connections being arranged, substantially as set forth, to prevent the door or closing device from moving away from in front of the aperture or doorway, substantially as described.

10. The combination, with a stock-car having in the side wall two or more apertures or doorways for the passage of animals' heads, of a door or doors united by a hinge-connection with the car near or below the lower parts of the apertures or doorways, a rock or rotating shaft mounted at or near the top of the car, and flexible connecting devices which unite said shaft at two or more points with the said door or doors, substantially as set forth.

11. The combination, with the stock-car provided with an aperture or apertures for the outward passage of animals' heads, of a closing device for said aperture or apertures, a weighted rock-shaft, and a flexible connection between the rock-shaft and the closing device, substantially as set forth.

12. In a stock-car having an aperture or opening in the side wall for the outward passage of an animal's head, a water-trough situated entirely outside of the horizontal boards or slats and below said aperture, in combination with a door or gate adapted to close the said aperture and united by a flexible connection with the car, and a retaining device which prevents the door from moving away from in front of the aperture, substantially as set forth.

13. The combination, with a stock-car having a side wall formed with vertical studs, and slats or casing-boards secured to the inner sides of the said studs, of an outward tilting and emptying water-trough mounted at the outer edges of the said studs, whereby the contents of the troughs can be emptied on a vertical line entirely outside of any portion of the side of the car, substantially as set forth.

14. The combination, with the stock-car having an aperture or opening for the outward passage of an animal's head, of an outward tilting and emptying water-trough below the said aperture and mounted upon an axis which is situated upon or inside of the plane of the center of gravity of the trough, whereby the weight of the contents can be utilized to assist in emptying them, substantially as set forth.

15. In a stock-car having an aperture or opening for the outward passage of an animal's head, a tilting water-trough below said aperture adapted to have its outer edge depressed in emptying, and a door or closing device for the aperture flexibly connected with the said water-trough, whereby the latter is operated when the door or closing device is moved, substantially as set forth.

16. The combination, with a tilting water-trough and an outwardly-moving door, of a link flexibly connected with said trough and door, whereby the latter is caused to push and pull the trough, substantially as set forth.

17. The combination, with a tilting water-trough and a movable door, of toggle-arms, one connected to the car and the other to the door, and means uniting the toggle-arms with the water-trough, substantially as set forth.

18. The combination, with the water-trough and the movable door, of the toggle-arms and the link pivoted directly to the trough and connected with the toggle-arms, substantially as set forth.

19. The combination of the tilting water-trough secured to the outside of the car, the door situated above the water-trough, and the supporting-bars secured to the car below the water-trough and arranged to swing in against the side of the car beyond the outer edges of the trough at the ends, substantially as set forth.

20. The combination, with the movable water-trough and a water-pipe connected therewith and extending downward therefrom, of a valve or closing device for said water-pipe situated below the trough, and means for opening said valve or closing device, and adapted to be operated simultaneously therewith, substantially as set forth.

21. The combination, with the car having an aperture and the movable door for closing said aperture, of a water-trough, a water-pipe connected therewith, a valve or closing device which, when open, permits the pipe to be emptied, and means connected with the movable door for operating said valve or closing device, substantially as set forth.

22. The combination, with the water-supply pipe and valve or closing device, whereby the escape of water is permitted from the pipe, of an operating connection, $S^3$, united with the movable parts of the car, substantially as and for the purposes set forth.

23. In a stock-car, the combination of a trough, a pipe communicating with said trough, said pipe having portions situated in one vertical plane and other portions in another or other vertical planes, a valve seated in one of the lower portions of the pipe, and a spring to hold the valve or closing device in place, the latter being adapted to be thrown out of place when the trough or pipe is to be emptied, substantially as set forth.

24. The combination, with a stock-car, of a trough or troughs secured to the outside of the wall of the car, a supply-pipe situated upon the opposite or inner side of the car-wall, and means, substantially as described, for conveying water from said inside supply-pipe to the outside trough or troughs.

25. The combination, with a stock-car, of a series of tilting water-troughs arranged along the outer side of the car-wall, a main water-supply pipe separate from and independent of the said troughs and situated upon the inside of the car-wall, and branch pipes communicating with the main supply-pipe and also with passages in the ends of the troughs, substantially as set forth.

26. The combination, with a stock-car, of the tilting water-troughs on the outside of the car, the tubular journals or hollow bearings for said troughs, a water-supply pipe separate from and independent of the said bearings or journals of the troughs, and one or more branch pipes connecting the supply-pipe with the tubular journals or bearings, substantially as set forth.

27. The combination, with a stock-car having apertures in the side for the outward passage of animals' heads, and having one or more entrance doorways extending to the bottom of the car, of water-troughs situated outside of the car and arranged in series, one series on each side of the aforesaid entrance-doorways, and a main supply-pipe separate from and independent of the said troughs and carried down beneath and across the said doorways, whereby the troughs may be moved independently of the said bent or curved main supply-pipe, substantially as set forth.

28. The combination, with a stock-car having a trough or troughs on each side, of a water-supply pipe extending across the ends of the car and connected with the water-troughs on each side, stop-cocks or valves therein, whereby one part of the car can be cut off from the supply independently of the other parts, and means for connecting the end cross-pipes with a water-supply, substantially as set forth.

29. The combination, with a stock-car having doors arranged alternately with respect to the transverse lines of the car, of partitions situated, respectively, opposite the doors, each having the end which is opposite to the door hinged on a vertical axis, whereby it is adapted to swing horizontally, substantially as and for the purposes set forth.

30. The combination, with the partition, of a hinge-connection uniting the partition to the car-body, said hinge-connection having two axes, one axis being vertical and one being horizontal, a lock which prevents the partition from accidentally moving around the vertical axis, and a second lock which prevents it from moving around the horizontal axis after it has been adjusted, substantially as set forth.

31. The combination, with the partition, of a horizontal guide, a support for the partition secured loosely to said guide, whereby it can be moved longitudinally, a perforated board or bar, and a pin adapted to hold the support in one of several positions, substantially as described.

32. The combination, with the partition, of a horizontal guide, a support for the partition hinged to said guide, whereby it is adapted to swing vertically, and the pin or catch secured to the support and adapted to be fastened at one or another of several points longitudinally of the car, substantially as described.

33. The combination, with a stock-car, of hinged interior casings, $m$, adapted to be carried near the roof when the car is laden with stock, and to be swung downwardly to lie against and re-enforce the upper part of the side walls when the car is used for other freight, substantially as set forth.

34. The combination, with a stock-car, of interior-hinged door-re-enforces extending to the bottom of the doorway and having the lower part thereof permanently closed, as at $m'$, and the upper part open for the insertion of freight, substantially as set forth.

35. In a compartment stock-car having openings upon both sides for the outward passing of the animals' heads, the combination of the horizontally-swinging transverse partitions, and water-troughs on both sides of the car and situated entirely outside thereof, substantially as set forth.

36. In a compartment stock-car, the combination of the horizontally-swinging transverse partitions forming compartments wherein each animal can face in either direction, a holder or holders for hay arranged along both sides of the car, openings through the sides of the car, and water-troughs upon both sides of the car and situated outside thereof, substantially as set forth.

37. In a compartment stock-car, the combination of one or more transverse hinged horizontally-swinging partitions or gates, whereby the car is divided into compartments, in which each animal can stand in either of two or more positions, a secondary roof below the top roof for holding hay over the animals' heads, openings in the sides of the car, and the watering-troughs attached to the outsides of the car and situated entirely outside of the inclosed space within the car-body, substantially as described.

38. The combination, with a stock-car having a door upon one side and another door on the other side of the car situated on transverse lines other than those of the first aforesaid door, of a partition hinged on a vertical axis opposite or nearly opposite to the first aforesaid door and a second partition similarly hinged opposite or nearly opposite to the second aforesaid door, substantially as set forth.

39. The combination, with a stock-car having a door on each side, said doors being on different lines transversely of the car, of horizontally-swinging hinged partitions respectively opposite or nearly opposite to the said doors and arranged substantially as set forth, whereby the swinging ends are adapted to overlap and to impinge one upon the other, substantially as set forth.

40. The herein-described method of loading live cattle upon a stock-car, said method consisting in first driving a limited number of cattle into the car at a point near one end thereof, then forcing them by a horizontally-swinging gate or barrier into a compartment at the other end of the car, subsequently admitting another limited number to the car and forcing them by another horizontally-swinging gate or barrier into a compartment at the opposite end of the car, and finally filling the central portion of the body of the car, substantially as set forth.

41. In a stock-car, the combination of horizontally-swinging transverse partitions arranged substantially as set forth, whereby several compartments are provided, in which each animal can face in either direction, with hay racks or holders along both sides of the car, and water-troughs upon both sides of the car and outside thereof, the car being provided with openings upon each side for the outward passage of the animals' heads, substantially as set forth.

42. In a stock-car for cattle, the combination of the studs, the permanent wall-slats secured to the insides of the studs and extending partway up toward the top, there being openings in the sides of the car for the outward passage of animals' heads, a series of tilting water-troughs mounted upon axes and constructed substantially as set forth, whereby the inner edges of the troughs are prevented from passing at any time inside of the line of the wall-slats, and a stop which prevents the outer edges of said trough from rocking above the position occupied when the animals are drinking, said outer edges being free to be depressed when the troughs are to be emptied, substantially as described.

43. The combination, with a stock-car, of tilting water-troughs, supply-pipes therefor, the rock-shaft or rotating shaft, the drainage-cocks, and operating mechanism connecting the rock-shaft or rotating shaft with both the troughs and the drainage-cocks, substantially as set forth.

44. The combination, with a stock-car, of the tilting water-troughs, the drainage-cocks, the doors or closing shutters, and the operating mechanism for said troughs, cocks, and doors or shutters, and the rock-shaft or rotating shaft adapted to operate all of said parts simultaneously, substantially as set forth.

45. The combination, with a stock-car for cattle having vertical studs, openings in the sides between said studs for the outward passage of animals' heads, and permanent wall-slats below the said openings, of a series of water-troughs respectively situated in the spaces between the studs and mounted on journals secured to the outer faces of the studs below said openings, said troughs and journals being constructed and arranged substantially as set forth, whereby the inner edges of the troughs are at all times prevented from passing inside of the studs and the outer edges are free to be depressed to empty the contents of the troughs outwardly, substantially as described.

46. The combination, with a stock-car having studs outside, of a trough situated in the space between two of said studs and mounted on an axis above the bottom and between the inner and outer edges, substantially as set forth.

47. The combination, with the stock-car having openings or apertures for the outward passage of animals' heads, of a water-trough on the outside of the car, a door or closing device for the aforesaid apertures or openings, a movable cover for the said water-trough, and means for connecting the cover with the said door or closing device, whereby it is moved by the latter, substantially as set forth.

48. In a stock-car provided with an aperture or opening in the side wall for the outward passage of animals' heads, the combination, with a door adapted to move toward and from the said aperture or opening, of a chain passing over a pulley, and means, substantially as described, attached to the chain for counterbalancing the door, as set forth.

49. In a stock-car provided with an aperture or opening in the side wall for the outward passage of animals' heads, the combination of a water-trough and a counterbalanced cover for said trough adapted to be moved into such position as to lie opposite the open side of the trough when the opening in the car-wall is closed and to be moved away from the trough when the animals are to have access thereto, substantially as set forth.

In testimony whereof I affix my signature in presence of two witnesses.

JOHN W. STREET.

Witnesses:
RICHD. H. LANE,
VINCENT ROSEMON.